US010496213B2

(12) United States Patent
Leigh et al.

(10) Patent No.: US 10,496,213 B2
(45) Date of Patent: Dec. 3, 2019

(54) ALTERABLE GROUND PLANE FOR TOUCH SURFACES

(71) Applicant: Tactual Labs Co., New York, NY (US)

(72) Inventors: Darren Leigh, Round Hill, VA (US); Ricardo Jorge Jota Costa, Toronto (CA)

(73) Assignee: Tactual Labs Co., New York, NY (US)

( * ) Notice: Subject to any disclaimer, the term of this patent is extended or adjusted under 35 U.S.C. 154(b) by 165 days.

(21) Appl. No.: 15/056,805

(22) Filed: Feb. 29, 2016

(65) Prior Publication Data

US 2017/0024050 A1 Jan. 26, 2017

Related U.S. Application Data

(60) Provisional application No. 62/121,931, filed on Feb. 27, 2015.

(51) Int. Cl.
  *G06F 3/041* (2006.01)
  *G06F 3/044* (2006.01)

(52) U.S. Cl.
  CPC ............ *G06F 3/0416* (2013.01); *G06F 3/044* (2013.01); *G06F 2203/04107* (2013.01); *G06F 2203/04108* (2013.01)

(58) Field of Classification Search
  CPC .......... G06F 3/044; G06F 3/045; G06F 3/041; G08C 21/00; H04W 88/02
  See application file for complete search history.

(56) References Cited

U.S. PATENT DOCUMENTS

| 2011/0096025 | A1* | 4/2011 | Slobodin | G06F 3/044 345/174 |
| 2011/0248949 | A1* | 10/2011 | Chang | G06F 3/0412 345/174 |
| 2012/0009983 | A1* | 1/2012 | Mow | H01Q 1/243 455/575.7 |
| 2012/0146943 | A1 | 6/2012 | Fairley et al. | |
| 2012/0194452 | A1 | 8/2012 | Cho et al. | |
| 2013/0172045 | A1 | 7/2013 | Caballero et al. | |
| 2014/0152621 | A1* | 6/2014 | Okayama | G06F 3/0416 345/174 |
| 2014/0253488 | A1* | 9/2014 | Vukovic | G06F 3/0418 345/174 |

FOREIGN PATENT DOCUMENTS

WO    2014182824    11/2014

* cited by examiner

*Primary Examiner* — Peter D McLoone
(74) *Attorney, Agent, or Firm* — Adam Landa

(57) ABSTRACT

Disclosed are a method and corresponding touch sensitive device that can be altered to change sensitivity and distance over which it interacts with an object. A touch sensor is configured to detect location of a touching object hovering above a touch surface. A ground plane is located behind the touch surface at a predetermined distance from the touch surface. A processor in the touch sensor is configured to control the effective distance between the ground plane and the touch surface and sensitivity of detection of a finger or touching object hovering above the touch surface.

19 Claims, 1 Drawing Sheet

ALTERABLE GROUND PLANE FOR TOUCH SURFACES

This application is a non-provisional of and claims priority to U.S. Provisional Patent Application No. 62/121,931 filed Feb. 27, 2015, the entire disclosure of which is incorporated herein by reference.

FIELD

The disclosed system and method relate in general to the field of user input, and in particular to user input systems and methods which utilize an alterable ground plane.

BACKGROUND

The present invention relates to touch sensors, examples of which are disclosed in U.S. patent application Ser. No. 14/945,083 filed Nov. 18, 2015, the entire disclosure of which is incorporated herein by reference.

The ability to sense pre-touch, or "hover" information on a touch sensor introduces many new possibilities for interacting with a touch-sensitive device. Numerous works have demonstrated the usefulness of having pre-touch information available (often described as "hover" information). See, e.g., U.S. patent application Ser. No. 14/490,363 filed Sep. 18, 2014, the entire disclosure of which is incorporated herein by reference. The detection of such hover information requires specific input hardware, often separate from the capacitive hardware that is responsible for identifying when the user is touching the sensor. Previous efforts have piggybacked on the capacitive information that is available just before the user touches, but these require a significant number of measurement frames to be analyzed before the pre-touch information can be of use, which is problematic for low-latency embodiments.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to operational illustrations of methods and devices for touch sensing using an alterable ground plane. It is understood that each step disclosed may be implemented by means of analog or digital hardware and computer program instructions. These computer program instructions may be stored on computer-readable media and provided to a processor of a general purpose computer, special purpose computer, ASIC, Field-Programmable Gate Array (FPGA), or other programmable data processing apparatus, such that the instructions, which execute via the processor of the computer or other programmable data processing apparatus, implements the functions/acts described. In some alternate implementations, the functions/acts described may occur out of the order noted in the operational illustrations. For example, two functions shown in succession may in fact be executed substantially concurrently or the functions may sometimes be executed in the reverse order, depending upon the functionality/acts involved.

Figure 1:
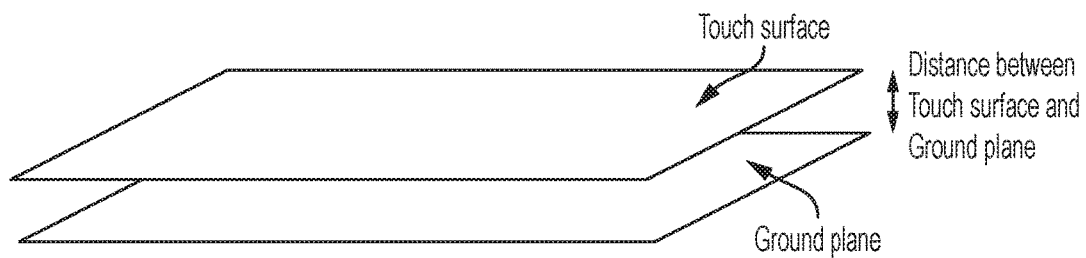
FIG. 1 shows diagrammatic perspective view illustrating a ground plane placed under or behind a touch surface.

In an embodiment, a touch sensor is provided that can be altered under computer control to change the sensitivity and distance over which it interacts with a finger, stylus, or other touching object. It can be advantageous for a ground plane (sometimes called a shield layer) to be placed under the touch surface. The ground plane "pulls" the electric fields closer to the touch surface, yielding an interaction distance that is smaller than would be the case if no ground plane were there. See FIG. 1.

With no ground plane, the touching object begins to interact with the touch surface at a greater distance, and the touch signal generated gradually increases from negligible to substantial as the touching object approaches the touch sensor. By adding a ground plane, at some distance behind the touch surface, the touch signal generated will remain negligible until the touching object gets much closer to the touch surface. As the distance or effective distance between the two decreases, the touch signal will rise rapidly. The rapid rise can be advantageous, providing a better, more responsive feel to the touch sensor. Without a ground plane, the feel can seem mushier and it is more difficult to detect the difference between the touch object being actually in contact with the touch surface and it being merely very close to the touch surface.

In an embodiment, a touch sensitive device uses a ground plane that can be altered under computer, or other, control so that the effective distance between the ground plane and the touch surface can be changed, or that the effective presence of the ground plane can be turned on or off. In an embodiment, the ground plane (or multiple planes) can be made frequency selective so that the ground plane appears to be at one distance (or present or not) at some set of frequencies, while appearing at different distances (or present or not) for different frequencies.

The ground plane can be designed to have particular characteristics that are permanently set, or it could be alterable by electrical, mechanical, optical, chemical, acoustic or other means.

In an embodiment, the ground plane is designed to mechanically move back and forth to different distances behind the touch surface. The movement can be accomplished by linear actuators, stepper motors, piezo transducers or other mechanical means.

In an embodiment, the ground plane is positioned at a distance behind the touch surface and constructed in pieces. These pieces are normally electrically disconnected from each other. The pieces can be electrically connected together via switches, thus turning the ground plane on or off. When the pieces are disconnected, their action as a ground plane is greatly reduced. When they are connected, their action as a ground plane is greatly enhanced. In various embodiments, the switches used to electrically connect or disconnect the pieces of the ground plane can be mechanical switches, relays, MEMS switches, diode switches, FET switches, or other suitable switching devices.

In an embodiment, several electrically alterable ground planes can be placed behind the touch surface at different distances and switched into effectiveness or not depending on the desired interaction distances with touching objects.

Figure 2:
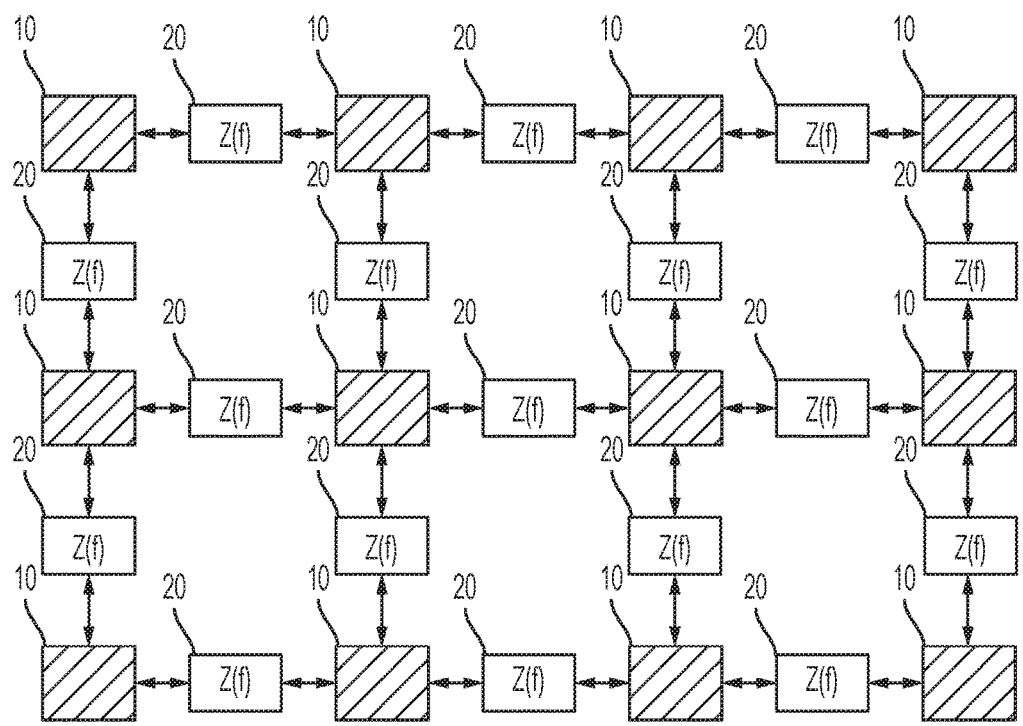
FIG. 2 shows a block diagram illustrating operation of an embodiment in which the ground plane is located at a distance behind the touch surface and constructed in pieces which are connected together by frequency selective electrical networks.

In an embodiment, the ground plane is designed to be frequency selective so that it is effective at some set of frequencies but less effective at others. In an embodiment, the ground plane is located at a distance behind the touch surface and constructed in pieces. These pieces are connected together by frequency selective electrical networks, such as low-pass filters, high-pass filters, band-pass filters, etc. so that the pieces appear to be electrically connected at some frequencies but not others. See FIG. 2. The Z(f) networks are filters whose impedance is a function of frequency.

In an embodiment, several frequency selective ground planes are placed at different distances behind the touch surface so that the touching object interacts with the touch surface differently depending on the frequencies of the signals that the touch sensor employs.

In an embodiment, the process steps described herein could be performed on a touch sensor's discrete touch controller. In another embodiment, such analysis and touch processing could be performed on other computer system components such as but not limited to ASIC, MCU, FPGA, CPU, GPU, SoC, DSP or a dedicated circuit. The term "hardware processor" as used herein means any of the above devices or any other device which performs computational functions.

Throughout this disclosure, the terms "touch", "touches," or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch" when used as a noun include a near touch and a near touch event, or any other gesture that can be identified using a sensor.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A touch-sensitive device that can be altered to change sensitivity and distance over which it interacts with an object, comprising:
    a touch sensor configured to detect location of a touching object hovering above a touch surface;
    a ground plane behind the touch surface at a predetermined distance from the touch surface;
    a processor in the touch sensor configured to control, at least, the:
        effective distances between the ground plane and the touch surface by creating, at least, a first effective distance between the ground plane and the touch surface and a second effective distance between the ground plane and the touch surface; and
        sensitivity of detection of a finger or touching object hovering above the touch surface.

2. The touch-sensitive device of claim 1, wherein the device comprises software configured to control the effective distance between the ground plane and the touch surface.

3. The touch-sensitive device of claim 1, wherein the device comprises software configured to control the sensitivity of detection of a finger or touching object hovering above the touch surface.

4. The touch-sensitive device of claim 1, wherein the ground plane can be turned on or off.

5. The touch-sensitive device of claim 4, wherein the ground plane is frequency selective.

6. The touch-sensitive device of claim 5, wherein the ground plane is at one distance at a predetermined set of frequencies, while appearing at different distances at different frequencies.

7. The touch-sensitive device of claim 4, wherein the ground plane is constructed in pieces.

8. The touch-sensitive device of claim 1, wherein the ground plane has permanently set characteristics.

9. The touch-sensitive device of claim 1, wherein the touching object is a finger.

10. The touch-sensitive device of claim 1, wherein the touching object is a stylus.

11. A touch-sensitive device comprising:
    a touch sensor capable of detecting location of a finger or touching object hovering above a touch surface;
    one or more ground planes placed behind the touch surface at predetermined distances from the touch surface;
    a processor in the touch sensor configured to control, at least, the:
        effective distances between the ground planes and the touch surface by creating, at least, a first effective distance between the ground plane and the touch surface and a second effective distance between the ground plane and the touch surface; and
        sensitivity of detection of a finger or touching object hovering above the touch surface.

12. The touch-sensitive device of claim 11, wherein the device comprises software configured to control the effective distance between the ground planes and the touch surface.

13. The touch-sensitive device of claim 11, wherein the device comprises software configured to control the sensitivity of detection of a finger or touching object hovering above the touch surface.

14. The touch-sensitive device of claim 11, wherein the ground planes have permanently set characteristics.

15. The touch-sensitive device of claim 11, wherein the ground planes are constructed in pieces.

16. The touch-sensitive device of claim 15, wherein the ground planes can be switched into effectiveness or not based on the desired interaction distances of a finger or touching object.

17. The touch-sensitive device of claim 11, wherein the ground planes can be altered electrically.

18. A touch-sensitive device comprising:
    a touch sensor capable of detecting location of a finger or touching object hovering above a touch surface;
        one or more ground planes placed behind the touch surface at predetermined distances from the touch surface;
        a processor in the touch sensor configured to control, at least, the:
        effective distance between the ground planes and the touch surface;
        sensitivity of detection of a finger or touching object hovering above the touch surface; and
        wherein some combination of the ground planes are frequency selective.

19. The touch-sensitive device of claim 18, wherein the ground planes are at certain distances at a certain predetermined set of frequencies, while appearing at different distances at different frequencies.

* * * * *